(12) United States Patent
Yang

(10) Patent No.: US 12,120,751 B2
(45) Date of Patent: Oct. 15, 2024

(54) RANDOM ACCESS METHOD, USER EQUIPMENT, AND STORAGE MEDIUM

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 318 days.

(21) Appl. No.: 17/558,448

(22) Filed: Dec. 21, 2021

(65) Prior Publication Data

US 2022/0117005 A1    Apr. 14, 2022

Related U.S. Application Data

(63) Continuation of application No. PCT/CN2019/098953, filed on Aug. 1, 2019.

(51) Int. Cl.
*H04W 74/08* (2024.01)
*H04W 24/10* (2009.01)
*H04W 56/00* (2009.01)
*H04W 72/02* (2009.01)
(Continued)

(52) U.S. Cl.
CPC ....... *H04W 74/0841* (2013.01); *H04W 24/10* (2013.01); *H04W 56/001* (2013.01); *H04W 72/02* (2013.01); *H04W 72/044* (2013.01); *H04W 74/0866* (2013.01)

(58) Field of Classification Search
CPC ............. H04W 74/0841; H04W 24/10; H04W 56/001; H04W 72/02; H04W 72/044; H04W 74/0866; H04W 74/004; H04W 74/0833; H04W 72/0453
See application file for complete search history.

(56) References Cited

U.S. PATENT DOCUMENTS

| 11,924,868 B2* | 3/2024 | Lee ................. H04W 72/52 |
| 2019/0150200 A1 | 5/2019 | Chen et al. |
| 2019/0159175 A1* | 5/2019 | Islam .............. H04W 72/02 |

(Continued)

FOREIGN PATENT DOCUMENTS

| CN | 109327912 | 2/2019 |
| CN | 109699087 | 4/2019 |

(Continued)

OTHER PUBLICATIONS

Chen et al. U.S. Appl. No. 62/796,854, filed Jan. 25, 2019 (Year: 2019).*

(Continued)

*Primary Examiner* — Wutchung Chu
(74) *Attorney, Agent, or Firm* — Hodgson Russ LLP

(57) ABSTRACT

A random access method and a related apparatus are provided in implementations of the present disclosure and are applicable to a user equipment (UE). The method includes the following. A first bandwidth part (BWP) is selected from multiple BWPs, where the multiple BWPs are configured by a network device. A first physical random access channel (PRACH) resource corresponding to a first synchronization signal block (SSB) is determined. A random access preamble is transmitted on the first BWP based on the first PRACH resource.

12 Claims, 4 Drawing Sheets

(51) Int. Cl.
*H04W 72/044* (2023.01)
*H04W 74/0833* (2024.01)

(56) References Cited

U.S. PATENT DOCUMENTS

| | | | | |
|---|---|---|---|---|
| 2019/0182000 | A1* | 6/2019 | Futaki | H04W 72/0453 |
| 2019/0215871 | A1 | 7/2019 | Aiba et al. | |
| 2019/0222290 | A1 | 7/2019 | Ly et al. | |
| 2020/0128588 | A1* | 4/2020 | Xiong | H04B 7/0617 |
| 2020/0245369 | A1* | 7/2020 | Chen | H04W 48/16 |
| 2020/0288507 | A1* | 9/2020 | Chang | H04L 5/0094 |
| 2021/0051688 | A1* | 2/2021 | Zhao | H04W 4/40 |
| 2021/0127372 | A1* | 4/2021 | Li | H04W 4/44 |
| 2021/0219112 | A1* | 7/2021 | Shilov | H04W 72/0453 |
| 2021/0298086 | A1* | 9/2021 | Jiang | H04W 74/0833 |
| 2021/0336688 | A1* | 10/2021 | Lee | H04W 4/40 |
| 2021/0377956 | A1* | 12/2021 | Lee | H04W 4/40 |
| 2021/0385669 | A1* | 12/2021 | Jung | H04B 7/0695 |
| 2022/0109963 | A1* | 4/2022 | Li | H04W 72/30 |

FOREIGN PATENT DOCUMENTS

| | | |
|---|---|---|
| CN | 109788573 | 5/2019 |
| CN | 109803396 A | 5/2019 |
| CN | 109842953 A | 6/2019 |
| CN | 109982431 | 7/2019 |
| CN | 110072291 | 7/2019 |
| WO | 2019050316 A1 | 3/2019 |
| WO | 2019095151 | 5/2019 |
| WO | 2019096150 | 5/2019 |

OTHER PUBLICATIONS

Vivo, "Increasing Msg1 Transmission Opportunities for NR-U," 3GPP TSG-RAN WG2 Meeting #105bis, R2-1903078, Apr. 2019.
Motorola Mobility et al., "Remaining details for BWP operation," 3GPP TSG RAN WG1 Meeting #93, R1-1807277, May 2018.
EPO, Extended European Search Report for EP Application No. 19939992.4, Jun. 14, 2022.
WIPO, International Search Report for PCT/CN2019/098953, Apr. 22, 2020.
CNIPA, First Office Action for CN Application No. 201980095150.6, Jul. 26, 2023.
EPO, Extended European Search Report for EP Application No. 23184867.2, Sep. 27, 2023.

* cited by examiner

RANDOM ACCESS METHOD, USER EQUIPMENT, AND STORAGE MEDIUM

CROSS REFERENCE TO RELATED APPLICATION(S)

This application is a continuation of International Application No. PCT/CN2019/098953, filed on Aug. 1, 2019, the entire disclosure of which is incorporated herein by reference.

TECHNICAL FIELD

The present disclosure relates to the field of communication technology, and more particular, to a random access method, a user equipment (UE), and a storage medium.

BACKGROUND

At present, each user equipment (UE) in an idle state or an inactive state may access a network through an initial bandwidth part (BWP) indicated in system information block (SIB1) broadcast, which is acceptable for light load scenarios. For heavy load scenarios, an introduction of a large number of UEs may lead to an increase of random access probability, and competition between these UEs is more likely to cause a random access failure.

SUMMARY

In a first aspect, a random access method is provided in implementations of the present disclosure. The method is applicable to a user equipment (UE) and includes the following. A first bandwidth part (BWP) is selected from multiple BWPs, where the multiple BWPs are configured by a network device. A first physical random access channel (PRACH) resource corresponding to a first synchronization signal block (SSB) is determined. A random access preamble is transmitted on the first BWP based on the first PRACH resource.

In a second aspect, a UE is provided in implementations of the present disclosure. The UE includes a processor, a transceiver, and a memory configured to store computer programs. The processor is configured to invoke and execute the computer programs stored in the memory to: select a first BWP from multiple BWPs, where the multiple BWPs are configured by a network device, determine a first PRACH resource corresponding to a first SSB, and cause the transceiver to transmit a random access preamble on the first BWP based on the first PRACH resource.

In a third aspect, a computer-readable storage medium is provided in implementations of the present disclosure. The computer-readable storage medium is configured to store computer programs which, when executed by a computer, are operable with the computer to perform the method in the first aspect of implementations of the present disclosure.

BRIEF DESCRIPTION OF THE DRAWINGS

In order to more clearly illustrate technical solutions in implementations of the present disclosure, the following will briefly introduce drawings required for description of implementations. Obviously, the drawings in the following description illustrate some implementations of the present disclosure. For those of ordinary skill in the art, other drawings can be obtained from these drawings without creative work.

DETAILED DESCRIPTION

The terms used in implementation part of the present disclosure are only used to illustrate specific implementations of the present disclosure, but not intended to limit the present disclosure. The terms "first", "second", "third", and "fourth" in the specification, claims, and drawings of the present disclosure are used to distinguish different objects, but not to describe a specific order. In addition, the terms "including", "comprising", "having", and any variations thereof are intended to cover non-exclusive inclusions.

Figure 1:
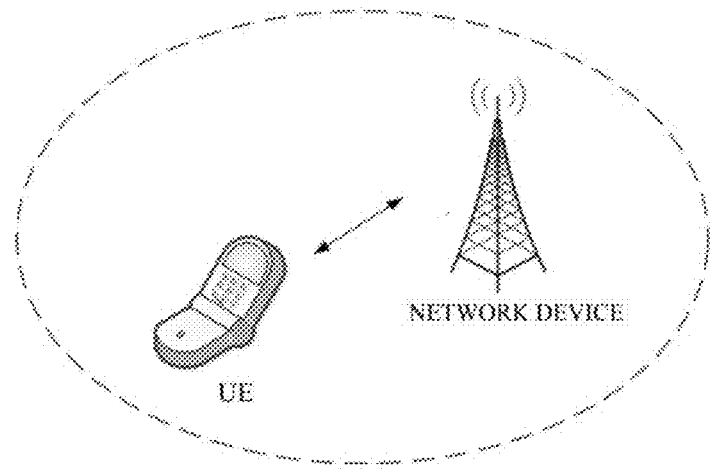
FIG. 1 is a schematic diagram of a communication system architecture provided in an implementation of the present disclosure.

Referring to FIG. 1, FIG. 1 is a schematic diagram of a communication system architecture provided in an implementation of the present disclosure. The communication system includes a network device and a user equipment (UE). As illustrated in FIG. 1, the network device can communicate with the UE. The communication system may be a global system for mobile communication (GSM), a code division multiple access (CDMA) system, a wideband code division multiple access (WCDMA) system, a worldwide interoperability for microwave access (WiMAX) system, a long term evolution (LTE) system, a 5th generation (5G) communication system, such as a new radio (NR) system, a communication system that integrates multiple communication technologies, such as a communication system that integrates LTE technologies and NR technologies, or a future evolved communication system. The form and the number of the network device and the UE illustrated in FIG. 1 are only for example, and do not constitute a limitation to implementations of the present disclosure.

The UE in the present disclosure is a device with a wireless communication function. The UE may be deployed on land, for example, deployed indoors or outdoors, and may be handheld, wearable, or vehicle-mounted. The UE may also be deployed on water, for example, on a ship, etc. The UE may also be deployed in the air, for example, on an airplane, an air balloon, a satellite, etc. The UE may be a mobile phone, a pad, a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in smart grid, a wireless terminal in smart home, etc. The UE may also be a handheld device, a vehicle-mounted device, a wearable device, or a computer device with a wireless communication function, or another processing device connected to a wireless modem. In different networks, the UE may have different names, such as, terminal device, access terminal, user unit, user station, mobile station, remote station, remote terminal, mobile device, user terminal, terminal, wireless communication device, user agent, or user device, cellular phone, cordless phone, session initiation protocol (SIP) phone, wireless local loop (WLL) station, personal digital assistant (PDA), terminal device in a 5G network or a future evolved network, etc.

The network device in the present disclosure is a device deployed in a wireless access network to provide a wireless communication function. For example, the network device may be a radio access network (RAN) device on access network side in a cellular network. The so-called RAN device is a device configured to connect the UE to a wireless network, and includes but is not limited to: an evolved node B (eNB), a radio network controller (RNC), a node B (NB), a base station controller (BSC), a base transceiver station (BTS), a home base station, for example, a home evolved node B or a home node B (HNB), a base band unit (BBU), or a mobility management entity (MME). For another example, the network device may also be a node device in a wireless local area network (WLAN), such as an access controller (AC), a gateway, or a wireless fidelity (Wi-Fi) access point (AP). For another example, the network device may also be a transmission node or a transmission reception point (TRP or TP) in an NR system.

5G application scenarios mainly include an enhanced Mobile Broadband (eMBB) scenario, an ultra-reliable low-latency communication (URLLC) scenario, a massive machine type of communication (mMTC) scenario, etc.

In 5G network environment, for reduction of air interface signaling and fast recovery of wireless connections and data services, a new radio resource control (RRC) state, i.e., an RRC inactive state is defined. The RRC inactive state is different from an RRC idle state and an RRC connected state.

In the RRC idle state, there is no RRC connection, mobility is based on UE cell selection/reselection, paging is initiated by a core network (CN), a paging area is configured by the CN, and there is no UE access stratum (AS) context in the network device.

In the RRC connected state, the RRC connection exists, the UE AS context exists in the network device and the UE, the network device is aware that a position of the UE is represented in a specific cell level, the mobility is controlled by the network device, and unicast data can be transmitted between the UE and the network device.

In the RRC inactive state, the mobility is based on UE cell selection/reselection, there is a connection between the CN and NR, the UE AS context exists in a network device, the paging is triggered by an RAN, an RAN-based paging area is managed by the RAN, and the network device is aware that the position of the UE is based on a paging area level of the RAN.

In the NR system, a supported maximum channel bandwidth, i.e., a wideband carrier, may reach 400 MHz. If the UE keeps working on the wideband carrier, power consumption of the UE is large. A radio frequency (RF) bandwidth of the UE may be adjusted according to an actual throughput of the UE to optimize the power consumption of the UE, this is the motivation for introducing BWP.

A UE in the connected state can only have one active downlink (DL) BWP and one active uplink (UL) BWP at most at a moment. The network device can configure up to four UL BWPs and up to four DL BWPs for the UE in the connected state. For a frequency division duplex (FDD) system, there is no explicit association between UL BWPs and DL BWPs. For example, the network device may configure four UL BWPs with indexes 0, 1, 2, 3 and four DL BWPs with indexes 0, 1, 2, 3 for a UE in the connected state, where a current active UL BWP may have index 0, and a current active DL BWP may have index 1. If the DL BWP is switched to another BWP via a downlink control information (DCI) command, for example, if the current active DL BWP 1 is switched to a DL BWP 2, the UL BWP may remain unchanged.

A UE in the idle state or in the inactive state obtains a master information block (MIB) and an SIB1 of a resident cell through a cell defining synchronization signal block (CD-SSB). The SIB1 indicates related configuration information of an initial BWP used for initial access of the UE. The related configuration information of the initial BWP contains related configuration information of an initial UL BWP and related configuration information of an initial DL BWP. In the related configuration information of the UL BWP, the network device configures a random access resource to the UE for initial access. There is a correspondence between random access resources and SSBs. The network device configures a reference signal received power (RSRP) threshold, such as an SSB RSRP threshold, to control the UE to select a random access resource. When the initial access is triggered, the UE selects an SSB with a RSRP measurement value satisfying the RSRP threshold, then selects a corresponding random access resource according to the correspondence between random access resources and SSBs to transmit a random access preamble, and receives a random access response message transmitted by the network device on the SSB selected.

Figure 2:
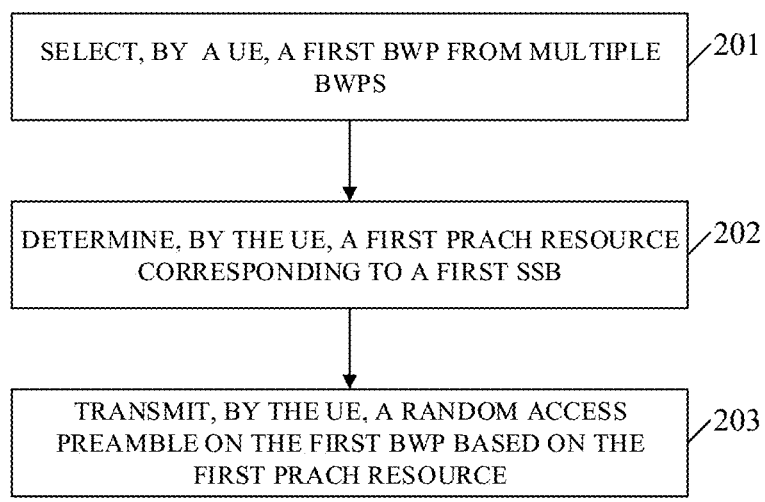
FIG. 2 is a schematic flowchart of a random access method provided in an implementation of the present disclosure.

Referring to FIG. 2, FIG. 2 is a schematic flowchart of a random access method provided in an implementation of the present disclosure. The method includes the following.

Step 201: a UE selects a first BWP from multiple BWPs, where the multiple BWPs are configured by a network device.

The multiple BWPs are used for random access, and may or may not include an initial BWP, which is not limited herein.

The multiple BWPs are configured by the network device through an SIB1. Specifically, the network device broadcasts information of each BWP among the multiple BWPs through the SIB1. The information of each BWP includes at least one of: a DL BWP configuration and a UL BWP configuration. The DL BWP configuration includes a physical downlink control channel (PDCCH) configuration and a physical downlink shared channel (PDSCH) configuration. The UL BWP configuration includes a physical uplink control channel (PUCCH) configuration, a physical uplink shared channel (PUSCH) configuration, and a random access channel (RACH) configuration. Of course, the multiple BWPs may also be configured by the network device through other SIBs, or configured by the network device through a radio resource control (RRC) dedicated signaling, such as an RRC release message, etc., which is not limited herein.

Step 202: the UE determines a first physical random access channel (PRACH) resource corresponding to a first SSB.

The UE determines the first PRACH resource corresponding to the first SSB based on a correspondence between SSBs and PRACH resources. The correspondence between SSBs and PRACH resources is configured by the network device.

The correspondence between SSBs and PRACH resources may be configured by the network device through an SIB1, configured by the network device through other SIBs, or configured by the network device through an RRC dedicated signaling, such as an RRC release message, etc., which is not limited herein.

The multiple BWPs each include the first SSB, or the first BWP selected includes the first SSB.

Step 203: the UE transmits a random access preamble on the first BWP based on the first PRACH resource.

It can be seen that, in implementations of the present disclosure, the network device configures multiple BWPs for the UE. The UE selects one BWP from the multiple BWPs, then determines a PRACH resource corresponding to an SSB, and finally transmits a random access preamble on the selected BWP based on the determined PRACH resource. In this way, PRACH resource capacity limitation is alleviated, a random access capacity is increased, thereby improving a success rate of random access.

Figure 3:
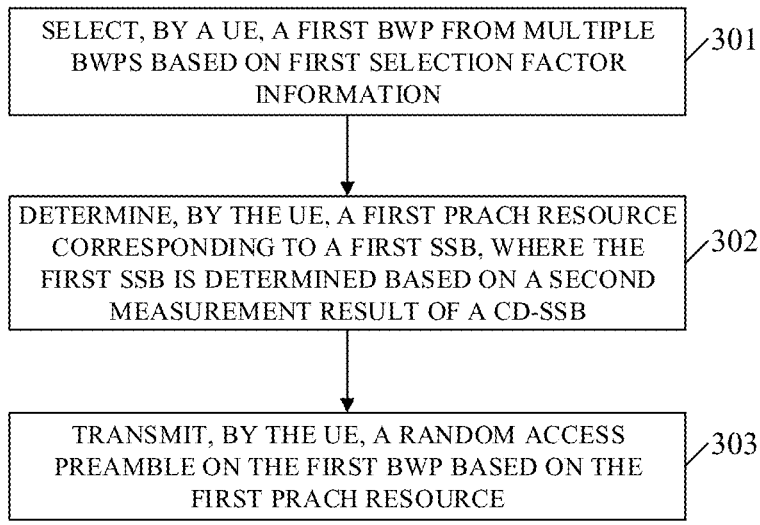
FIG. 3 is a schematic flowchart of another random access method provided in an implementation of the present disclosure.

Method Implementation 1:

Referring to FIG. 3, FIG. 3 is a schematic flowchart of another random access method provided in an implementation of the present disclosure. The method includes the following.

Step 301: a UE selects a first BWP from multiple BWPs based on first selection factor information, where the first selection factor information is configured by a network device.

The first selection factor information may be configured by the network device through an SIB1, configured by the network device through other SIBs, or configured by the network device through an RRC dedicated signaling, such as an RRC release message, etc., which is not limited herein.

In an implementation of the present disclosure, the first selection factor information indicates that the multiple BWPs each have a same selection factor.

For example, assuming that the multiple BWPs include four BWPs, the first selection factor information indicates that selection factors of the four BWPs are the same. If a sum of the selection factors of the four BWPs is equal to 1, then the four BWPs each have a selection factor of 0.25.

In an implementation of the present disclosure, the first selection factor information indicates selection factors of the multiple BWPs.

For example, assuming that the multiple BWPs include four BWPs: BWP0, BWP1, BWP2, and BWP3, the first selection factor information indicates that a selection factor of BWP0 is a, a selection factor of BWP1 is b, a selection factor of BWP2 is b, and a selection factor of BWP3 is d, a+b+c+d=1.

In an implementation of the present disclosure, the multiple BWPs include an initial BWP, and the first selection factor information indicates a selection factor of the initial BWP and indicates that BWPs among the multiple BWPs other than the initial BWP each have a same selection factor.

For example, assuming that the multiple BWPs include four BWPs, the first selection factor information indicates that a selection factor of the initial BWP is a, and that selection factors of other BWPs are the same. If a sum of selection factors of the four BWPs is equal to 1, the other three BWPs each have a selection factor of (1−a)/3.

In an implementation of the present disclosure, the UE selects the first BWP from the multiple BWPs based on the first selection factor information as follows.

The UE determines a selection factor of each BWP among the multiple BWPs based on the first selection factor information. The UE randomly selects the first BWP from the multiple BWPs based on the determined selection factor of each BWP.

In an implementation of the present disclosure, the UE randomly selects the first BWP from the multiple BWPs based on the determined selection factor of each BWP as follows.

The UE generates multiple first numerical intervals based on the determined selection factor of each BWP, and generates a first random number, where the generated multiple first numerical intervals are in one-to-one correspondence with the multiple BWPs. The UE selects the first BWP from the multiple BWPs based on the first random number and the multiple first numerical intervals.

For example, assuming that the multiple BWPs include BWP0, BWP1, BWP2, and BWP3, if the four BWPs each have a selection factor of 0.25, the generated first numerical intervals include 0~0.25, 0.25~0.5, 0.5~0.75, and 0.75~1, a first numerical interval 0~0.25 corresponds to BWP0, a first numerical interval 0.25~0.5 corresponds to BWP1, a first numerical interval 0.5~0.75 corresponds to BWP2, and a first numerical interval 0.75~1 corresponds to BWP3. If the generated first random number, such as a random number from 0 to 1, falls within 0~0.25, the first BWP is BWP0, if the generated first random number falls within 0.25~0.5, the first BWP is BWP1, if the generated first random number falls within 0.5~0.75, the first BWP is BWP2, and if the generated first random number falls within 0.75~1, the first BWP is BWP3.

For another example, assuming that the multiple BWPs include BWP0, BWP1, BWP2, and BWP3, if a selection factor of BWP0 is a, a selection factor of BWP1 is b, a selection factor of BWP2 is c, and a selection factor of BWP3 is d, a+b+c+d=1, the generated first numerical intervals include 0~a, a~a+b, a+b~a+b+c, and a+b+c~1, a first numerical interval 0~a corresponds to BWP0, a first numerical interval a~a+b corresponds to BWP1, a first numerical interval a+b~a+b+c corresponds to BWP2, and a first numerical interval a+b+c~1 corresponds to BWP3. If the generated first random number, such as a random number from 0 to 1, falls within 0~a, the first BWP is BWP0, if the generated first random number falls within a~a+b, the first BWP is BWP1, if the generated first random number falls within a+b~a+b+c, the first BWP is BWP2, and if the generated first random number falls within a+b+c~1, the first BWP is BWP3.

In an implementation of the present disclosure, the UE selects the first BWP from the multiple BWPs based on the first selection factor information as follows.

The UE determines a selection factor of each BWP among the multiple BWPs based on the first selection factor information. The UE selects the first BWP from the multiple BWPs based on the determined selection factor of each BWP, where a selection factor of the first BWP is greater than or equal to a selection factor of every BWP other than the first BWP.

For example, assuming that the multiple BWPs include BWP0, BWP1, BWP2, and BWP3, a selection factor of BWP0 is a, a selection factor of BWP1 is b, a selection factor of BWP2 is c, and a selection factor of BWP3 is d, if a>b>c>d, the first BWP is BWP0, and if a=b>c>d, the first BWP is BWP0 or BWP1.

It should be noted that, the above method for BWP selection based on selection factors is only for illustration, but not for limitation. It should be appreciated that, other methods for BWP selection based on selection factors may also be adopted.

Step 302: the UE determines a first PRACH resource corresponding to a first SSB, where the first SSB is determined based on a second measurement result of a CD-SSB, the multiple BWPs each include the CD-SSB, and a RSRP of the first SSB is greater than or equal to a second RSRP threshold.

The multiple BWPs each include the first SSB.

The second RSRP threshold may be, for example, the above-mentioned SSB RSRP threshold or have other values.

The UE is aware of a position of the CD-SSB, and performs SSB measurement on the CD-SSB to obtain the second measurement result. The second measurement result includes RSRPs of multiple SSBs, and the multiple SSBs include the first SSB.

Step 303: the UE transmits a random access preamble on the first BWP based on the first PRACH resource.

It can be seen that, in implementations of the present disclosure, the network device configures multiple BWPs for the UE. The UE selects one BWP from the multiple BWPs based on selection factor information indicated by the network device, determines an SSB based on a measurement result of a CD-SSB, then determines a PRACH resource corresponding to the SSB, and finally transmits a random access preamble on the selected BWP based on the determined PRACH resource. In this way, PRACH resource capacity limitation is alleviated, a random access capacity is increased, thereby improving a success rate of random access.

Figure 4:
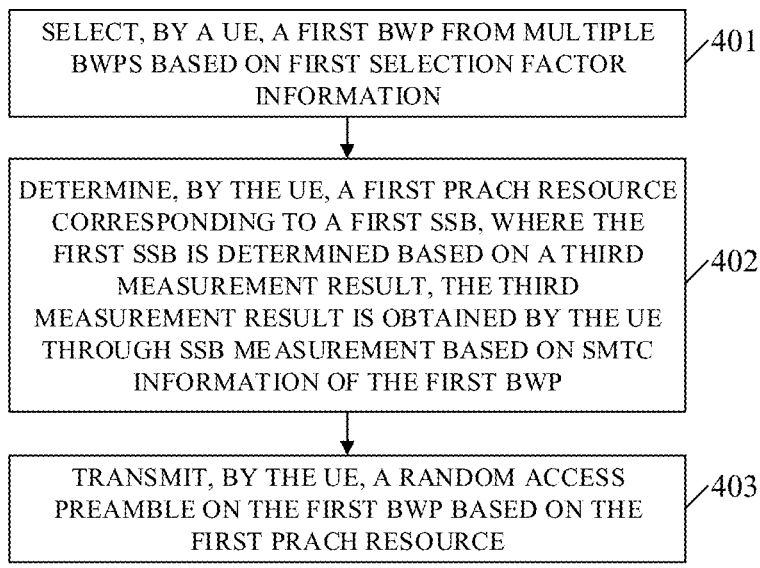
FIG. 4 is a schematic flowchart of another random access method provided in an implementation of the present disclosure.

Method Implementation 2:

Referring to FIG. 4, FIG. 4 is a schematic flowchart of another random access method provided in an implementation of the present disclosure. The method includes the following.

Step 401: a UE selects a first BWP from multiple BWPs based on first selection factor information, where the first selection factor information is configured by a network device.

It should be noted that, the above method for BWP selection based on selection factors is only for illustration, but not for limitation. It should be appreciated that, other methods for BWP selection based on selection factors may also be adopted.

Step 402: the UE determines a first PRACH resource corresponding to a first SSB, where the first SSB is determined based on a third measurement result, the third measurement result is obtained by the UE through SSB measurement based on SSB measurement timing configuration (SMTC) information of the first BWP, the SMTC information of the first BWP is configured by the network device, and a RSRP of the first SSB is greater than or equal to a third RSRP threshold.

The first BWP selected includes the first SSB.

The third RSRP threshold may be, for example, the above-mentioned SSB RSRP threshold or have other values.

The network device may also configure SMTC information of BWPs among the multiple BWP other than the first BWP.

The SMTC information may be configured by the network device through an SIB1 (specifically, the SMTC information may be or not be configured in BWP information, which is not limited herein), configured by the network device through other SIBs, or configured by the network device through an RRC dedicated signaling, such as an RRC release message, etc., which is not limited herein.

The SMTC information includes at least one of: an SSB measurement period, offset, and measurement duration. The third measurement result obtained by the UE through SSB measurement based on the SMTC information of the first BWP includes RSRPs of multiple SSBs, and the multiple SSBs include the first SSB.

Step 403: the UE transmits a random access preamble on the first BWP based on the first PRACH resource.

It can be seen that, in implementations of the present disclosure, the network device configures multiple BWPs for the UE. The UE selects one BWP from the multiple BWPs based on the selection factor information indicated by the network device, performs SSB measurement based on SMTC information of the selected BWP to obtain a measurement result, then determines an SSB based on the measurement result, determines a PRACH resource corresponding to the SSB, and finally transmits a random access preamble on the selected BWP based on the determined PRACH resource. In this way, PRACH resource capacity limitation is alleviated, a random access capacity is increased, thereby improving a success rate of random access. In addition, compared with method implementation 1, in this implementation, there is no need for every configured BWP to include the CD-SSB, thereby enabling the network device to allocate BWP positions more flexibly.

It should be noted that, for part of the specific implementation process in this implementation, reference may be made to the specific implementation process described in the foregoing method implementation, which will not be described herein.

Figure 5:
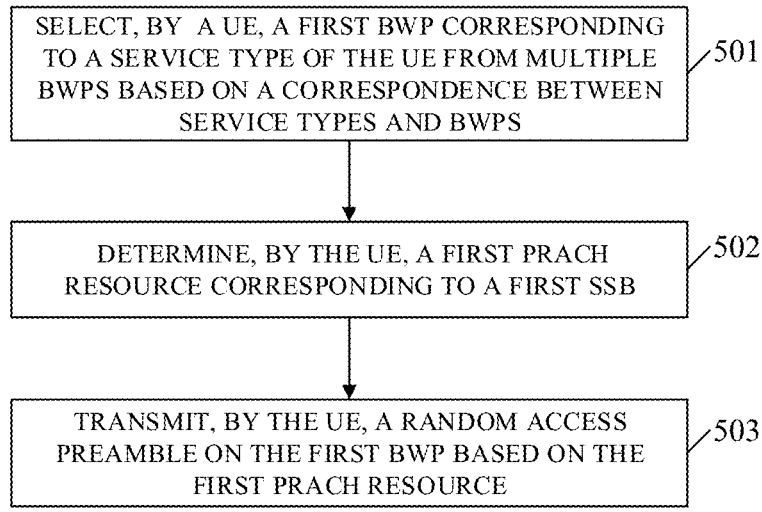
FIG. 5 is a schematic flowchart of another random access method provided in an implementation of the present disclosure.

Method Implementation 3:

Referring to FIG. 5, FIG. 5 is a schematic flowchart of another random access method provided in an implementation of the present disclosure. The method includes the following.

Step 501: a UE selects a first BWP corresponding to a service type of the UE from multiple BWPs based on a correspondence between service types and BWPs, where the correspondence between service types and BWPs is configured by a network device.

The correspondence between service types and BWPs may be configured by the network device through an SIB1, configured by the network device through other SIBs, or configured by the network device through an RRC dedicated signaling, such as an RRC release message, etc., which is not limited herein.

For example, assuming that the multiple BWPs include BWP0, BWP1, BWP2, and BWP3, the correspondence between service types and BWPs includes, for example, industrial sensor network devices corresponding to BWP1, video surveillance devices corresponding to BWP2 or BWP0, and wearable devices corresponding to BWP3. For another example, assuming that the multiple BWPs include BWP0, BWP1, BWP2, and BWP3, the correspondence between service types and BWPs includes, for example, industrial sensor network devices corresponding to BWP1, video surveillance devices corresponding to BWP2, wearable devices corresponding to BWP3, and others corresponding to BWP0.

In an implementation of the present disclosure, the method further includes the following.

If the service type of the UE corresponds to multiple first BWPs, the UE selects a first BWP from the multiple first BWPs based on second selection factor information, where the second selection factor information is configured by the network device.

The second selection factor information may be configured by the network device through an SIB1, configured by the network device through other SIBs, or configured by the network device through an RRC dedicated signaling, such as an RRC release message, etc., which is not limited herein.

In an implementation of the present disclosure, the second selection factor information indicates that the multiple BWPs each have a same selection factor.

In an implementation of the present disclosure, the second selection factor information indicates selection factors of the multiple BWPs.

In an implementation of the present disclosure, the multiple BWPs include an initial BWP, and the second selection factor information indicates a selection factor of the initial BWP and indicates that BWPs among the multiple BWPs other than the initial BWP each have a same selection factor.

In an implementation of the present disclosure, the UE selects the first BWP from the multiple first BWPs based on the second selection factor information as follows.

The UE determines a selection factor of each first BWP among the multiple first BWPs based on the second selection factor information. The UE randomly selects the first BWP from the multiple first BWPs based on the determined selection factor of each first BWP.

In an implementation of the present disclosure, the UE randomly selects the first BWP from the multiple first BWPs based on the determined selection factor of each first BWP as follows.

The UE generates multiple second numerical intervals based on the determined selection factor of each first BWP, and generates a second random number, where the generated multiple second numerical intervals are in one-to-one correspondence with the multiple first BWPs. The UE selects the first BWP from the multiple first BWPs based on the second random number and the multiple second numerical intervals.

For example, assuming that the multiple BWPs include BWP0, BWP1, BWP2, and BWP3, if the first BWP selected in step 501 includes BWP0 and BWP1, the second selection factor information indicates that the multiple BWPs each have a same selection factor, if a sum of selection factors of the four BWPs is equal to 1, then BWP0 and BWP1 each have a selection factor of 0.25, and the generated second numerical intervals include 0~0.25+(0.25+0.25)/2 and 0.25+(0.25+0.25)/2~1. A second numerical interval 0~0.5 corresponds to BWP0, and a second numerical interval 0.5~1 corresponds to BWP1. If the generated second random number, such as a random number from 0 to 1, falls within 0~0.5, the first BWP selected is BWP0, and if the generated second random number falls within 0.5~1, the first BWP selected is BWP1.

For another example, assuming that the multiple BWPs include BWP0, BWP1, BWP2, and BWP3, if the first BWP selected in step 501 includes BWP0 and BWP1, the second selection factor information indicates that a selection factor of BWP0 is a, a selection factor of BWP1 is b, a selection factor of BWP2 is c, and a selection factor of BWP3 is d, a+b+c+d=1, then the generated second numerical intervals include 0~a+(1−a−b)/2 and a+(1−a−b)/2~1. A second numerical interval 0~a+(1−a−b)/2 corresponds to BWP0, and a second numerical interval a+(1−a−b)/2~1 corresponds to BWP1. If the generated second random number, such as a random number from 0 to 1, falls within 0~a+(1−a−b)/2, the first BWP selected is BWP0, and if the generated second random number falls within a+(1−a−b)/2~1, the first BWP selected is BWP1.

In an implementation of the present disclosure, the UE selects the first BWP from the multiple first BWPs based on the second selection factor information as follows.

The UE determines a selection factor of each first BWP among the multiple first BWPs based on the second selection factor information. The UE selects the first BWP from the multiple first BWPs based on the determined selection factor of each first BWP, where a selection factor of the first BWP is greater than or equal to a selection factor of every BWP other than the first BWP.

For example, assuming that the multiple BWPs include BWP0, BWP1, BWP2, and BWP3, if the first BWP selected in step 501 includes BWP0 and BWP1, a selection factor of BWP0 is a, a selection factor of BWP1 is b, a selection factor of BWP2 is c, and a selection factor of BWP3 is d, if a>b, then the first BWP selected is BWP0.

It should be noted that, the above method of BWP selection based on the correspondence between service types and BWPs and the method of BWP selection based on selection factors are only for illustration, but not for limitation. It should be appreciated that, other methods for BWP selection based on selection factors may also be adopted.

Step 502: the UE determines a first PRACH resource corresponding to a first SSB.

In an implementation of the present disclosure, the first SSB is determined based on a second measurement result of a CD-SSB, the multiple BWPs each include the CD-SSB, and a RSRP of the first SSB is greater than or equal to a second RSRP threshold.

In an implementation of the present disclosure, the first SSB is determined based on a third measurement result, the third measurement result is obtained by the UE through SSB measurement based on SMTC information of the first BWP selected, the SMTC information of the first BWP selected is configured by the network device, and a RSRP of the first SSB is greater than or equal to a third RSRP threshold.

Step 503: the UE transmits a random access preamble on the first BWP based on the first PRACH resource.

It can be seen that, in implementations of the present disclosure, the network device configures multiple BWPs for the UE. The UE selects one BWP from the multiple BWPs based on a correspondence between service types and BWPs indicated by the network device, then determines a PRACH resource corresponding to a SSB, and finally transmits a random access preamble on the selected BWP based on the determined PRACH resource. In this way, PRACH resource capacity limitation is alleviated, a random access capacity is increased, thereby improving a success rate of random access. In addition, BWPs are allocated based on service types, thereby realizing on-demand resource allocation and load balancing.

It should be noted that, for part of the specific implementation process in this implementation, reference may be made to the specific implementation process described in the foregoing method implementation, which will not be described herein.

Figure 6:
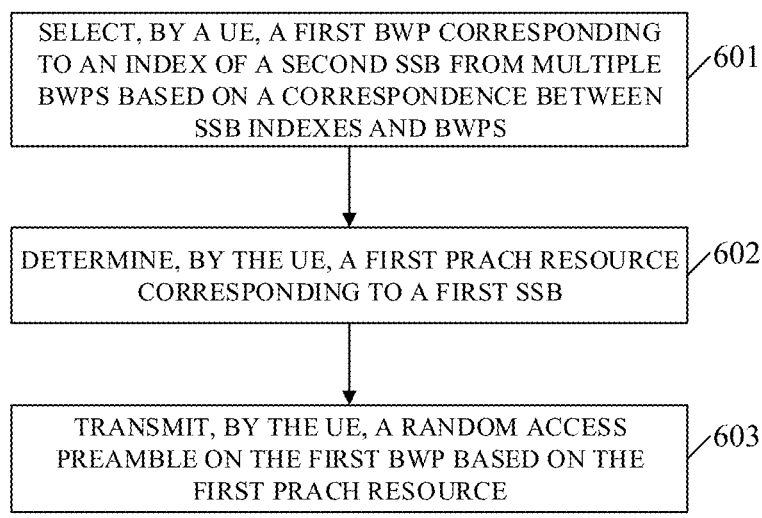
FIG. 6 is a schematic flowchart of another random access method provided in an implementation of the present disclosure.

Method Implementation 4:

Referring to FIG. 6, FIG. 6 is a schematic flowchart of another random access method provided in an implementation of the present disclosure. The method includes the following.

Step 601: a UE selects a first BWP corresponding to an index of a second SSB from multiple BWPs based on a correspondence between SSB indexes and BWPs, where the correspondence between SSB indexes and BWPs is configured by the network device, the second SSB is determined based on a first measurement result of a CD-SSB, and a RSRP of the second SSB is greater than or equal to a first RSRP threshold.

The first RSRP threshold may be, for example, the above-mentioned SSB RSRP threshold or have other values.

The UE is aware of a position of the CD-SSB, and performs SSB measurement on the CD-SSB to obtain the first measurement result. The first measurement result includes RSRPs of multiple SSBs, and the multiple SSBs include the second SSB. The second SSB is an SSB with a maximum RSRP value among the multiple SSBs.

The correspondence between SSB indexes and BWPs may be configured by the network device through an SIB1, configured by the network device through other SIBs, or configured by the network device through an RRC dedicated signaling, such as an RRC release message, etc., which is not limited herein.

For example, assuming that the multiple BWPs include BWP0, BWP1, BWP2, and BWP3, the correspondence between SSB indexes and BWPs includes, for example, indexes 1 and 2 corresponding to BWP0, indexes 3 and 4 corresponding to BWP1, indexes 5 and 6 corresponding to BWP2, and indexes 7 and 8 corresponding to BWP3. For another example, assuming that the multiple BWPs include BWP0, BWP1, BWP2, and BWP3, the correspondence between SSB indexes and BWPs include, for example, indexes 1, 2, and 3 corresponding to BWP0, indexes 4 and 5 corresponding to BWP1, indexes 6, 7, and 8 corresponding to BWP2, and other corresponding to BWP3.

In an implementation of the present disclosure, the method further includes the following.

If the index of the second SSB corresponds to multiple first BWPs, the UE selects a first BWP from the multiple first BWPs based on third selection factor information, where the third selection factor information is configured by the network device.

The third selection factor information may be configured by the network device through an SIB1, configured by the network device through other SIBs, or configured by the network device through an RRC dedicated signaling, such as an RRC release message, etc., which is not limited herein.

In an implementation of the present disclosure, the third selection factor information indicates that the multiple BWPs each have a same selection factor.

In an implementation of the present disclosure, the third selection factor information indicates selection factors of the multiple BWPs.

In an implementation of the present disclosure, the multiple BWPs include an initial BWP, and the third selection factor information indicates a selection factor of the initial BWP and indicates that BWPs among the multiple BWPs other than the initial BWP each have a same selection factor.

In an implementation of the present disclosure, the UE selects the first BWP from the multiple first BWPs based on the third selection factor information as follows.

The UE determines a selection factor of each first BWP among the multiple first BWPs based on the third selection factor information. The UE randomly selects the first BWP from the multiple first BWPs based on the determined selection factor of each first BWP.

In an implementation of the present disclosure, the UE randomly selects the first BWP from the multiple first BWPs based on the determined selection factor of each first BWP as follows.

The UE generates multiple third numerical intervals based on the determined selection factor of each first BWP, and generates a third random number, where the generated multiple third numerical intervals are in one-to-one correspondence with the multiple first BWPs. The UE selects the first BWP from the multiple first BWPs based on the third random number and the multiple third numerical intervals.

For example, assuming that the multiple BWPs include BWP0, BWP1, BWP2, and BWP3, if the first BWP selected in step 601 includes BWP0 and BWP1, the third selection factor information indicates that the multiple BWPs each have a same selection factor, if a sum of selection factors of the four BWPs is equal to 1, then BWP0 and BWP1 each have a selection factor of 0.25, and the generated third numerical intervals include 0~0.25+(0.25+0.25)/2 and 0.25+(0.25+0.25)/2~1. A third numerical interval 0~0.5 corresponds to BWP0, and a third numerical interval 0.5~1 corresponds to BWP1. If the generated third random number, such as a random number from 0 to 1, falls within 0~0.5, the first BWP selected is BWP0, and if the generated third random number falls within 0.5~1, the first BWP selected is BWP1.

For another example, assuming that the multiple BWPs include BWP0, BWP1, BWP2, and BWP3, if the first BWP selected in step 601 includes BWP0 and BWP1, the third selection factor information indicates that a selection factor of BWP0 is a, a selection factor of BWP1 is b, a selection factor of BWP2 is c, and a selection factor of BWP3 is d, $a+b+c+d=1$, then the generated third numerical intervals include $0\sim a+(1-a-b)/2$ and $a+(1-a-b)/2\sim 1$. A third numerical interval $0\sim a+(1-a-b)/2$ corresponds to BWP0, and a third numerical interval $a+(1-a-b)/2\sim 1$ corresponds to BWP1. If the generated third random number, such as a random number from 0 to 1, falls within $0\sim a+(1-a-b)/2$, the first BWP selected is BWP0, and if the third random number generated falls within $a+(1-a-b)/2\sim 1$, the first BWP selected is BWP1.

In an implementation of the present disclosure, the UE selects the first BWP from the multiple first BWPs based on the third selection factor information as follows.

The UE determines a selection factor of each first BWP among the multiple first BWPs based on the third selection factor information. The UE selects the first BWP from the multiple first BWPs based on the determined selection factor of each first BWP, where a selection factor of the first BWP is greater than or equal to a selection factor of every BWP other than the first BWP.

For example, assuming that the multiple BWPs include BWP0, BWP1, BWP2, and BWP3, if the first BWP selected in step 601 includes BWP0 and BWP1, a selection factor of BWP0 is a, a selection factor of BWP1 is b, a selection factor of BWP2 is c, and a selection factor of BWP3 is d, if $a>b$, then the first BWP selected is BWP0.

It should be noted that, the above method of BWP selection based on the correspondence between SSB indexes and BWPs and the method of BWP selection based on selection factors are only for illustration, but not for limitation. It should be appreciated that, other methods for BWP selection based on selection factors may can also be adopted.

Step 602: the UE determines a first PRACH resource corresponding to a first SSB.

The first SSB and the second SSB are a same SSB.

In an implementation of the present disclosure, the first SSB is determined based on a second measurement result of a CD-SSB, the multiple BWPs each include the CD-SSB, and a RSRP of the first SSB is greater than or equal to a second RSRP threshold.

In an implementation of the present disclosure, the first SSB is determined based on a third measurement result, the third measurement result is obtained by the UE through SSB measurement based on SMTC information of the first BWP selected, the SMTC information of the first BWP selected is configured by the network device, and a RSRP of the first SSB is greater than or equal to a third RSRP threshold.

Step 603: the UE transmits a random access preamble on the first BWP based on the first PRACH resource.

It can be seen that, in implementations of the present disclosure, the network device configures multiple BWPs for the UE. The UE selects one BWP from the multiple BWPs based on a correspondence between SSB indexes and BWPs indicated by the network device, then determines a PRACH resource corresponding to a SSB, and finally transmits a random access preamble on the selected BWP based on the determined PRACH resource. In this way, PRACH resource capacity limitation is alleviated, a random access capacity is increased, thereby improving a success rate of random access. In addition, BWPs are allocated based on SSB indexes, thereby realizing on-demand resource allocation and load balancing.

It should be noted that, for part of the specific implementation process in this implementation, reference may be made to the specific implementation process described in the foregoing method implementation, which will not be described herein.

Figure 7:
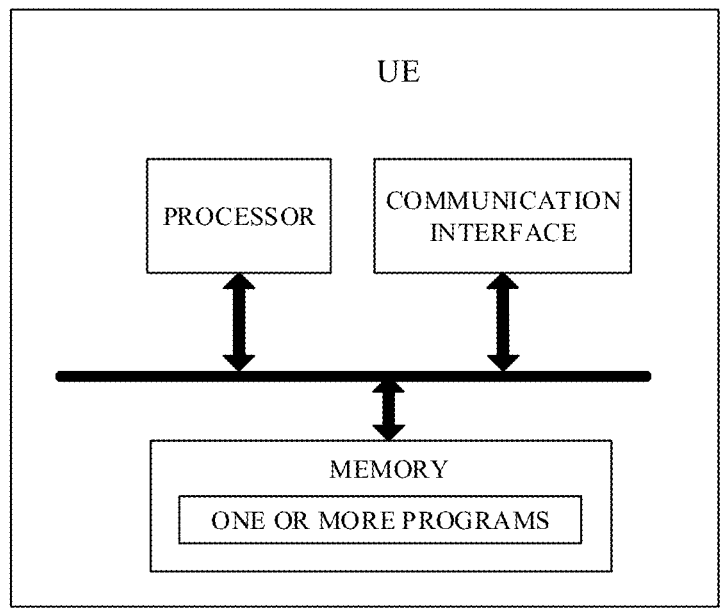
FIG. 7 is a schematic structural diagram of a user equipment (UE) provided in an implementation of the present disclosure.

Referring to FIG. 7, FIG. 7 is a UE provided in an implementation of the present disclosure. The UE includes one or more processors, one or more memories configured to store one or more programs, and one or more communication interfaces. The one or more programs are configured to be executed by the one or more processor and includes instructions configured to perform the following.

A first BWP is selected from multiple BWPs, where the multiple BWPs are configured by a network device. A first PRACH resource corresponding to a first SSB is determined. A random access preamble is transmitted on the first BWP based on the first PRACH resource.

In an implementation of the present disclosure, in terms of selecting the first BWP from the multiple BWPs, the program includes instructions specifically configured to perform the following.

The first BWP is selected from the multiple BWPs based on first selection factor information, where the first selection factor information is configured by the network device.

In an implementation of the present disclosure, the first selection factor information indicates that the multiple BWPs each have a same selection factor.

In an implementation of the present disclosure, the first selection factor information indicates selection factors of the multiple BWPs.

In an implementation of the present disclosure, the multiple BWPs include an initial BWP, and the first selection factor information indicates a selection factor of the initial BWP and indicates that BWP among the multiple BWPs other than the initial BWP each have a same selection factor.

In an implementation of the present disclosure, in terms of selecting the first BWP from the multiple BWPs, the program includes instructions specifically configured to perform the following.

The first BWP corresponding to a service type of the UE is selected from the multiple BWPs based on a correspondence between service types and BWPs, where the correspondence between service types and BWPs is configured by the network device.

In an implementation of the present disclosure, the program further includes instructions configured to perform the following.

If the service type of the UE corresponds to multiple first BWPs, a first BWP is selected from the multiple first BWPs based on second selection factor information, where the second selection factor information is configured by the network device.

In an implementation of the present disclosure, in terms of selecting the first BWP from the multiple BWPs, the program includes instructions specifically configured to perform the following.

The first BWP corresponding to an index of a second SSB is selected from the multiple BWPs based on a correspondence between SSB indexes and BWPs, where the correspondence between SSB indexes and BWPs is configured by the network device, the second SSB is determined based on a first measurement result of a CD-SSB, and a RSRP of the second SSB is greater than or equal to a first RSRP threshold.

In an implementation of the present disclosure, the first SSB and the second SSB are a same SSB.

In an implementation of the present disclosure, the program further includes instructions configured to perform the following.

If the index of the second SSB corresponds to multiple first BWPs, a first BWP is selected from the multiple first BWPs based on third selection factor information, where the third selection factor information is configured by the network device.

In an implementation of the present disclosure, the first SSB is determined based on a second measurement result of a CD-SSB, the multiple BWPs each include the CD-SSB, and a RSRP of the first SSB is greater than or equal to a second RSRP threshold.

In an implementation of the present disclosure, the first SSB is determined based on a third measurement result, the second measurement result is obtained by the UE through SSB measurement based on SMTC information of the first BWP, the SMTC information of the first BWP is configured by the network device, and a RSRP of the first SSB is greater than or equal to a third RSRP threshold.

It should be noted that, for the specific implementation process in this implementation, reference may be made to the specific implementation process described in the foregoing method implementation, which will not be described herein.

Figure 8:
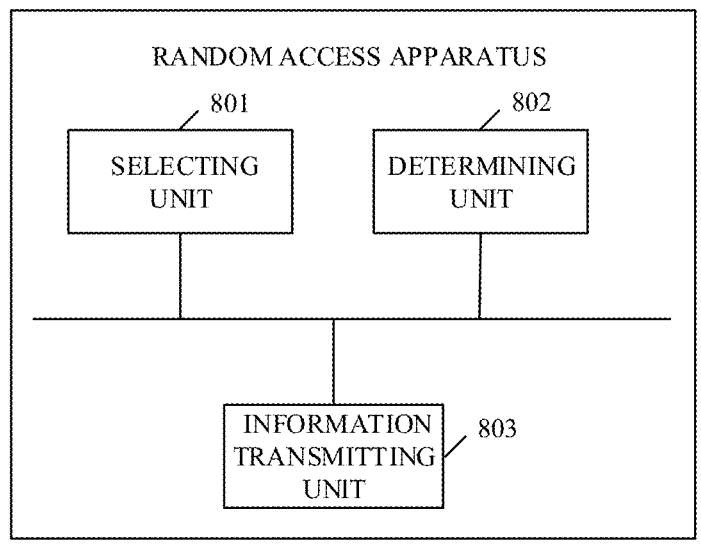
FIG. 8 is a schematic structural diagram of a random access apparatus provided in an implementation of the present disclosure.

Referring to FIG. 8, FIG. 8 is a random access apparatus provided in an implementation of the present disclosure. The apparatus is applicable to a UE and includes a selecting unit 801, a determining unit 802, and an information transmitting unit 803.

The selecting unit 801 is configured to select a first BWP from multiple BWPs, where the multiple BWPs are configured by a network device. The determining unit 802 is configured to determine a first PRACH resource corresponding to a first SSB. The information transmitting unit 803 is configured to transmit a random access preamble on the first BWP based on the first PRACH resource.

In an implementation of the present disclosure, in terms of selecting the first BWP from the multiple BWPs, the selecting unit 801 is specifically configured to: select the first BWP from the multiple BWPs based on first selection factor information, where the first selection factor information is configured by the network device.

In an implementation of the present disclosure, the first selection factor information indicates that the multiple BWPs each have a same selection factor.

In an implementation of the present disclosure, the first selection factor information indicates selection factors of the multiple BWPs.

In an implementation of the present disclosure, the multiple BWPs include an initial BWP, and the first selection factor information indicates a selection factor of the initial BWP and indicates that BWPs among the multiple BWPs other than the initial BWP each have a same selection factor.

In an implementation of the present disclosure, in terms of selecting the first BWP from the multiple BWPs, the selecting unit 801 is specifically configured to: select the first BWP corresponding to a service type of the UE from the multiple BWPs based on a correspondence between service types and BWPs, where the correspondence between service types and BWPs is configured by the network device.

In an implementation of the present disclosure, the selecting unit 801 is further configured to: if the service type of the UE corresponds to multiple first BWPs, select a first BWP from the multiple first BWPs based on second selection factor information, where the second selection factor information is configured by the network device.

In an implementation of the present disclosure, in terms of selecting the first BWP from the multiple BWPs, the selecting unit 801 is specifically configured to: select the first BWP corresponding to an index of a second SSB from the multiple BWPs based on a correspondence between SSB indexes and BWPs, where the correspondence between SSB indexes and BWPs is configured by the network device, the second SSB is determined based on a first measurement result of a CD-SSB, and a RSRP of the second SSB is greater than or equal to a first RSRP threshold.

In an implementation of the present disclosure, the first SSB and the second SSB are a same SSB.

In an implementation of the present disclosure, the selecting unit 801 is further configured to: if the index of the second SSB corresponds to multiple first BWPs, select a first BWP from the multiple first BWPs based on third selection factor information, where the third selection factor information is configured by the network device.

In an implementation of the present disclosure, the first SSB is determined based on a second measurement result of a CD-SSB, the multiple BWPs each include the CD-SSB, and a RSRP of the first SSB is greater than or equal to a second RSRP threshold.

In an implementation of the present disclosure, the first SSB is determined based on a third measurement result, the third measurement result is obtained by the UE through SSB measurement based on SMTC information of the first BWP, the SMTC information of the first BWP is configured by the network device, and a RSRP of the first SSB is greater than or equal to a third RSRP threshold.

It should be noted that, the selecting unit 801 and the determining unit 802 may be implemented by a processor, and the information transmitting unit 803 may be implemented by a communication interface.

A computer storage medium is also provided in implementations of the present disclosure. The computer storage medium is configured to store computer programs for electronic data interchange. The computer programs are operable with a computer to perform any method in method implementations. The computer includes a UE.

A computer program product is also provided in implementations of the present disclosure. The computer program product includes computer program instructions which are operable with a computer to perform any method in method implementations. The computer program product may be a software installation package. The computer includes a UE.

A chip is also provided in implementations of the present disclosure. The chip includes computer program instructions which are operable with a computer to perform any method in method implementations. The computer includes a UE.

A computer program is also provided in implementations of the present disclosure. The computer program is operable with a computer to perform any method in method implementations. The computer includes a UE.

It should be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a universal serial bus (USB) flash disk, a read-only memory (ROM), a random-access memory (RAM), a removable hard disk, disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), disk or compact disc (CD), and so on.

Implementations of the present disclosure are described in detail above, and specific examples are used herein to illustrate principles and implementations of the present disclosure. The illustration of implementations above is only used to help understand the methods and core ideas of the present disclosure. At the same time, for those of ordinary skill in the art, based on the ideas of the present disclosure, there may be changes in the specific implementations and scope of the present disclosure. In conclusion, the content of this specification should not be construed as a limitation to the present disclosure.

What is claimed is:

1. A random access method, being applicable to a user equipment (UE) in an idle state or an inactive state, and comprising:
   selecting a first bandwidth part (BWP) from a plurality of BWPs, the plurality of BWPs being configured by a network device;
   determining a first physical random access channel (PRACH) corresponding to a first synchronization signal block (SSB); and
   transmitting a random access preamble on the first BWP based on the first PRACH resource;
   wherein selecting the first BWP from the plurality of BWPs comprises:
      selecting the first BWP corresponding to a service type of the UE from the plurality of BWPs based on a correspondence between service types and BWPs, wherein the correspondence between service types and BWPs is configured by the network device; and
      selecting the first BWP from the plurality of BWPs based on first selection factor information, wherein the first selection factor information is configured by the network device, wherein the plurality of BWPs comprises an initial BWP, and the first selection factor information indicates a selection factor of the initial BWP and indicates that BWPs among the plurality of BWPs other than the initial BWP each have a same selection factor.

2. The method of claim 1, further comprising:
   if the service type of the UE corresponds to a plurality of first BWPs,
      selecting a first BWP from the plurality of first BWPs based on second selection factor information, wherein the second selection factor information is configured by the network device.

3. The method of claim 1, wherein selecting the first BWP from the plurality of BWPs further comprises:
   selecting the first BWP corresponding to an index of a second SSB from the plurality of BWPs based on a correspondence between SSB indexes and BWPs, wherein the correspondence between SSB indexes and BWPs is configured by the network device, the second SSB is determined based on a first measurement result of a cell defining SSB (CD-SSB), and a reference signal received power (RSRP) of the second SSB is greater than or equal to a first RSRP threshold.

4. The method of claim 3, wherein the first SSB and the second SSB are a same SSB.

5. The method of claim 3, further comprising:
   if the index of the second SSB corresponds to a plurality of first BWPs,
      selecting a first BWP from the plurality of first BWPs based on third selection factor information, wherein the third selection factor information is configured by the network device.

6. The method of claim 1, wherein the first SSB is determined based on a second measurement result of a CD-SSB, the plurality of BWPs each comprise the CD-SSB, and a RSRP of the first SSB is greater than or equal to a second RSRP threshold.

7. The method of claim 1, wherein the first SSB is determined based on a third measurement result, the third measurement result is obtained by the UE through SSB measurement based on SSB measurement timing configuration (SMTC) information of the first BWP, the SMTC information of the first BWP is configured by the network device, and a RSRP of the first SSB is greater than or equal to a third RSRP threshold.

8. A non-transitory computer-readable storage medium configured to store computer programs which, when executed by a computer, are operable with the computer to perform the method of claim 1.

9. A user equipment (UE) in an idle state or an inactive state comprising:
   a processor;
   a transceiver; and
   a memory configured to store computer programs, wherein the processor is configured to invoke and execute the computer programs stored in the memory to:
      select a first bandwidth part (BWP) from a plurality of BWPs, the plurality of BWPs being configured by a network device;
      determine a first physical random access channel (PRACH) resource corresponding to a first synchronization signal block (SSB); and
      cause the transceiver to transmit a random access preamble on the first BWP based on the first PRACH resource;
   wherein the processor configured to select the first BWP from the plurality of BWPs is configured to:
      select the first BWP corresponding to a service type of the UE from the plurality of BWPs based on a correspondence between service types and BWPs, wherein the correspondence between service types and BWPs is configured by the network device; and
      select the first BWP from the plurality of BWPs based on first selection factor information, wherein the first selection factor information is configured by the network device, wherein the plurality of BWPs comprises an initial BWP, and the first selection factor information indicates a selection factor of the initial BWP and indicates that BWPs among the plurality of BWPs other than the initial BWP each have a same selection factor.

10. The UE of claim 9, wherein the processor is further configured to invoke and execute the computer programs stored in the memory to:
   if the service type of the UE corresponds to a plurality of first BWPs, select a first BWP from the plurality of first BWPs based on second selection factor information, wherein the second selection factor information is configured by the network device.

11. The UE of claim 9, wherein the processor configured to select the first BWP from the plurality of BWPs is further configured to:

select the first BWP corresponding to an index of a second SSB from the plurality of BWPs based on a correspondence between SSB indexes and BWPs, wherein the correspondence between SSB indexes and BWPs is configured by the network device, the second SSB is determined based on a first measurement result of a cell defining SSB (CD-SSB), and a reference signal received power (RSRP) of the second SSB is greater than or equal to a first RSRP threshold.

12. The UE of claim 11, wherein the first SSB and the second SSB are a same SSB.

* * * * *